United States Patent
Blackmore et al.

(10) Patent No.: US 8,511,733 B2
(45) Date of Patent: Aug. 20, 2013

(54) PANEL END CAP STORAGE

(75) Inventors: Kathleen Blackmore, Northville, MI (US); Thomas William Pietila, Brighton, MI (US); Anthony Ligi, Chelsea, MI (US); Bhavani Thota, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 13/223,528

(22) Filed: Sep. 1, 2011

(65) Prior Publication Data

US 2013/0057012 A1    Mar. 7, 2013

(51) Int. Cl.
*B60R 7/12* (2006.01)
*B60R 7/06* (2006.01)

(52) U.S. Cl.
USPC .......... 296/37.12; 211/62; 224/281; 224/483; 224/544; 224/915

(58) Field of Classification Search
USPC .............. 211/62, 88.01, 94.01; 224/281, 224/483, 543, 544, 915; 296/37.1, 37.8, 296/37.12, 37.13; D12/425
See application file for complete search history.

(56) References Cited

U.S. PATENT DOCUMENTS

| | | | | |
|---|---|---|---|---|
| 937,278 A * | 10/1909 | Barnard | ......................... | 224/278 |
| 1,490,657 A * | 4/1924 | Botella | ......................... | 296/37.1 |
| 1,589,230 A * | 6/1926 | Roedding | ..................... | 224/282 |
| 1,590,006 A * | 6/1926 | Werley | ............................ | 70/255 |
| 1,600,446 A * | 9/1926 | Wood | ............................ | 131/239 |
| 1,625,011 A * | 4/1927 | Wolfe et al. | .................... | 312/242 |
| 1,641,249 A * | 9/1927 | Blumental | .................... | 312/204 |
| 1,885,692 A * | 11/1932 | Dugan | ............................ | 40/660 |
| 2,140,870 A * | 12/1938 | Emery | ......................... | 224/483 |
| 2,301,730 A * | 11/1942 | Mann | ......................... | 312/293.2 |
| 2,426,113 A * | 8/1947 | Northcutt | ................... | 296/37.13 |
| 2,435,687 A * | 2/1948 | Latin | ........................ | 131/235.1 |
| 2,798,445 A * | 7/1957 | Gehman | ......................... | 109/50 |
| 3,081,126 A * | 3/1963 | Theberge | ..................... | 296/37.1 |
| 3,124,287 A * | 3/1964 | Belzer | ......................... | 224/311 |
| 3,232,661 A * | 2/1966 | Walsh | ......................... | 296/37.12 |
| 3,423,571 A * | 1/1969 | Trachtenberg et al. | ....... | 219/441 |
| 4,375,268 A * | 3/1983 | Speck | ......................... | 224/556 |
| 4,378,888 A * | 4/1983 | Reed | ............................ | 211/63 |

(Continued)

FOREIGN PATENT DOCUMENTS

DE    3510405 A1 *  9/1986
DE    3812571 A1 * 10/1989

(Continued)

OTHER PUBLICATIONS

Motor Trend, http://www.motortrend.com/photo_galery/112_0809_2009_rolls_royce_phantom_coupe_gallery/photo_21.html, website printout 2009.

*Primary Examiner* — Glenn Dayoan
*Assistant Examiner* — Paul Chenevert
(74) *Attorney, Agent, or Firm* — Vichit Chea; Price Heneveld LLP (57) ABSTRACT

A panel end cap storage unit is disposed on an instrument panel end cap adjacent a vehicle door and is configured such that the unit is not accessible when the vehicle door is closed. In this way, the present invention provides a nonvisible secure storage unit that is only accessible when the adjacent vehicle door is open.

17 Claims, 6 Drawing Sheets

(56) References Cited

U.S. PATENT DOCUMENTS

| | | | | |
|---|---|---|---|---|
| 4,445,720 A | * | 5/1984 | Leaf et al. | 296/37.12 |
| 4,700,848 A | * | 10/1987 | Fujiki et al. | 211/63 |
| 4,807,920 A | | 2/1989 | Fujiki et al. | |
| 5,129,615 A | * | 7/1992 | Strauss | 248/311.2 |
| 5,469,977 A | * | 11/1995 | Tipton | 211/62 |
| 5,716,091 A | * | 2/1998 | Wieczorek | 296/37.16 |
| 5,758,811 A | * | 6/1998 | Aumiller et al. | 224/563 |
| 5,795,005 A | * | 8/1998 | Garfias et al. | 296/37.5 |
| 5,800,004 A | * | 9/1998 | Ackeret | 296/37.13 |
| 5,803,325 A | * | 9/1998 | Wang | 224/275 |
| 6,095,388 A | * | 8/2000 | Neville, Sr. | 224/556 |
| 6,109,493 A | * | 8/2000 | Bieri | 224/483 |
| 6,116,672 A | * | 9/2000 | Cannon et al. | 296/37.13 |
| 6,755,455 B2 | * | 6/2004 | Choi | 296/37.12 |
| 7,159,920 B2 | * | 1/2007 | Byma et al. | 296/37.8 |
| 7,328,825 B2 | * | 2/2008 | Kaiser | 224/543 |
| 7,594,686 B2 | | 9/2009 | Augustyn | |
| 2004/0041425 A1 | * | 3/2004 | Collavo | 296/37.8 |
| 2004/0084922 A1 | | 5/2004 | Park et al. | |
| 2004/0154953 A1 | * | 8/2004 | Ravikumar | 206/525 |
| 2005/0173483 A1 | * | 8/2005 | Ravikumar et al. | 224/483 |
| 2006/0028043 A1 | * | 2/2006 | Zeidman | 296/37.13 |
| 2007/0241582 A1 | | 10/2007 | McKeever | |

FOREIGN PATENT DOCUMENTS

| | | | |
|---|---|---|---|
| EP | 1798110 A1 | * | 6/2007 |
| FR | 2615803 A1 | * | 12/1988 |
| JP | 56050812 A | * | 5/1981 |
| JP | 57147932 A | * | 9/1982 |
| JP | 04078737 A | * | 3/1992 |
| JP | 04087850 A | * | 3/1992 |
| JP | 06166360 A | * | 6/1994 |
| JP | 2005041451 A | * | 2/2005 |
| JP | 2005104350 A | | 4/2005 |
| JP | 2007308108 A | * | 11/2007 |

* cited by examiner

PANEL END CAP STORAGE

FIELD OF THE INVENTION

The present invention generally relates to a storage unit for use within a vehicle instrument panel, and, more particularly, a vehicle storage unit disposed on an instrument panel end cap.

BACKGROUND OF THE INVENTION

Small storage compartments often exist within a vehicle interior in the cockpit area and are often times generally disposed on the vehicle instrument panel. In today's vehicles, cargo and storage space is necessary, however, available space on an instrument panel is at a premium, such that nonvisible and secure storage solutions inside the vehicle cabin are desired.

The present invention provides a panel end cap storage unit that is disposed on an instrument panel end cap adjacent a vehicle door and is configured such that the unit is not accessible when the vehicle door is closed. In this way, the present invention provides a nonvisible secure storage unit that is only accessible when the adjacent vehicle door is open.

SUMMARY OF THE INVENTION

One aspect of the present invention includes a storage unit disposed on a panel end cap adjacent a vehicle door, the storage unit comprising a housing having an upper first end with an opening and a lower second end, wherein the opening is not accessible when the adjacent vehicle door is in a closed position. The housing further comprises guides which are integrally formed along the length of the housing. A cylindrical tray insert is removably received within the guides of the storage compartment and the guides are configured to keep the tray insert in an upright position. The tray insert further includes a storage compartment for storing items of the vehicle user.

Another aspect of the present invention includes a storage unit disposed on a panel end cap adjacent a vehicle door, the storage unit comprising an elongate cylindrical housing having a first end with an opening and a second end, wherein the opening is not accessible when the adjacent vehicle door is in a closed position. The housing further comprises guides which are integrally formed along the length of the housing. A cylindrical tray insert is removably disposed within the guides of the housing and the tray insert further includes a storage compartment.

Yet another aspect of the present invention includes a storage unit disposed on a panel end cap adjacent a vehicle door, the storage unit comprising a housing having an upper first open end forming an entrance and a horizontally lower second end, wherein the entrance is not accessible when the adjacent vehicle door is in a closed position. A tray insert is slideably received within the storage compartment and includes a storage compartment.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
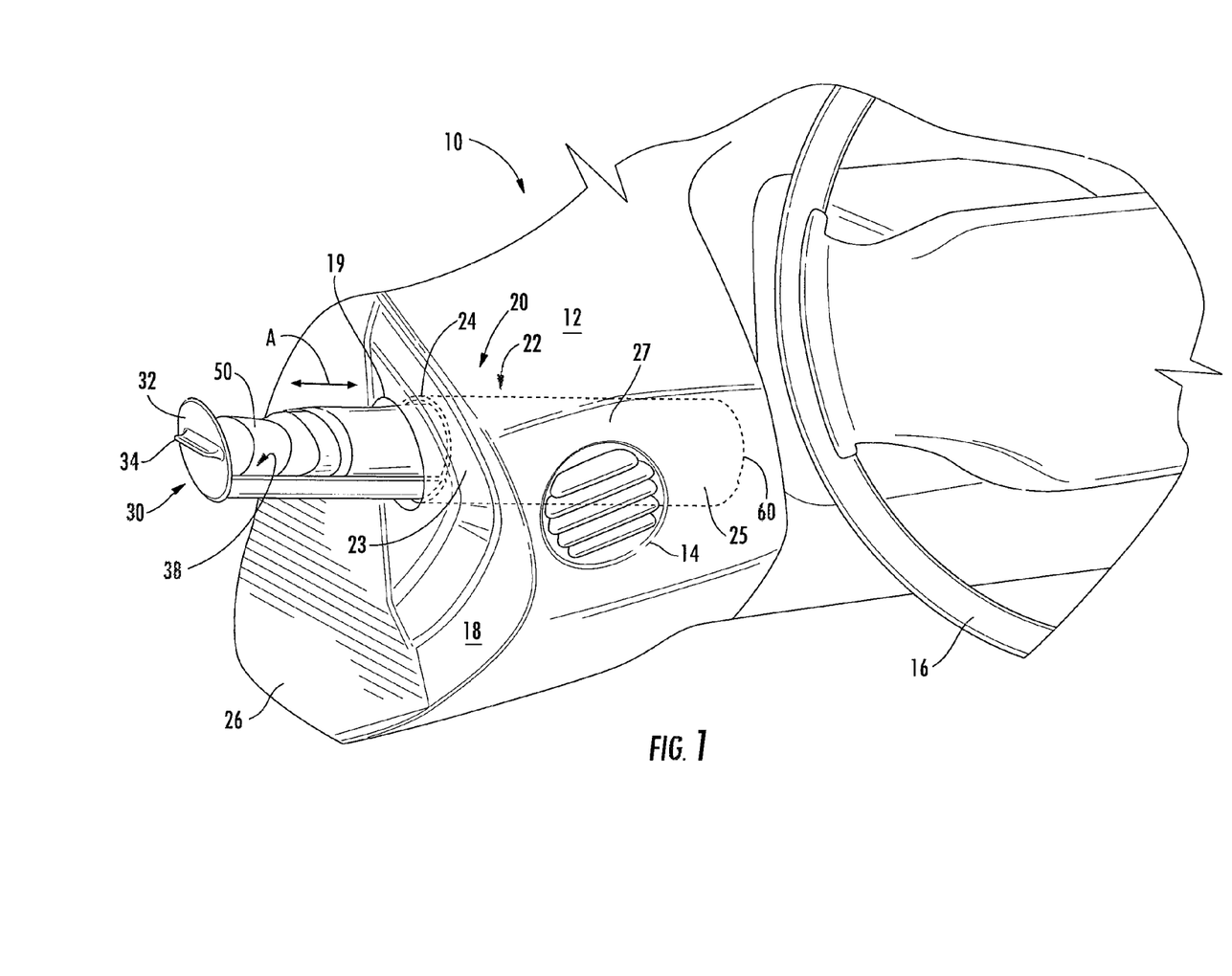
FIG. 1 is a perspective view of a panel end cap storage unit as found in a vehicle according to embodiments of the present invention.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Referring to FIG. 1, the reference numeral 10 generally designates a vehicle interior, and specifically designates the vehicle interior on the driver's side. The vehicle interior 10 includes an instrument panel 12 upon which a vent 14 and a steering wheel 16 are generally disposed. The instrument panel 12 further comprises an instrument panel end cap 18 disposed at the end of the instrument panel 12 having an aperture 19 which opens into the vehicle instrument panel 12. The instrument panel end cap 18 is situated adjacent to a vehicle door 48 (FIG. 4) having an interior trim door panel 26 as further described below.

Reference numeral 20 generally designates a panel end cap storage unit having a housing 22 and a tray insert 30. The storage housing 22 is a downwardly angled housing having an upper first end 23 and a lower second end 25. The storage housing 22 further includes a tube-like cavity portion 27 defined by an opening 24 disposed on the upper first end 23 and an end wall 60 disposed on the lower second end 25. The opening 24 disposed on the upper first end 23 of the housing 22 is configured to slideably receive the tray insert 30 which, as shown in FIG. 1, slides in and out of the tube-like cavity portion 27 of the housing 22 from a stowed position to a removed position in a direction indicated by arrow A. As shown in FIG. 1, the tray insert 30 is in a partially removed position relative to the storage housing 22.

The storage tray 30 comprises a front wall 32 having a pull or handle 34 disposed thereon which the user engages to pull the tray insert 30 from the storage housing 22. The panel end cap storage unit 20 is capable of storing a variety of items including wallets, keys, cell phones, and other personal items, and, in the embodiment shown in FIG. 1, an umbrella 50 is shown disposed within a storage compartment 38 of the tray insert 30 of the panel end cap storage unit 20. The panel end cap storage unit 20 is shown in FIG. 1 disposed on the driver's side of the vehicle instrument panel 12, however, the storage unit 20 can also be disposed on the passenger side end of instrument panel 12. The panel end cap storage unit 20 is accessible when a vehicle door is in the open position and is not accessible when the same vehicle door is in the closed position, as further described below.

Figure 2:
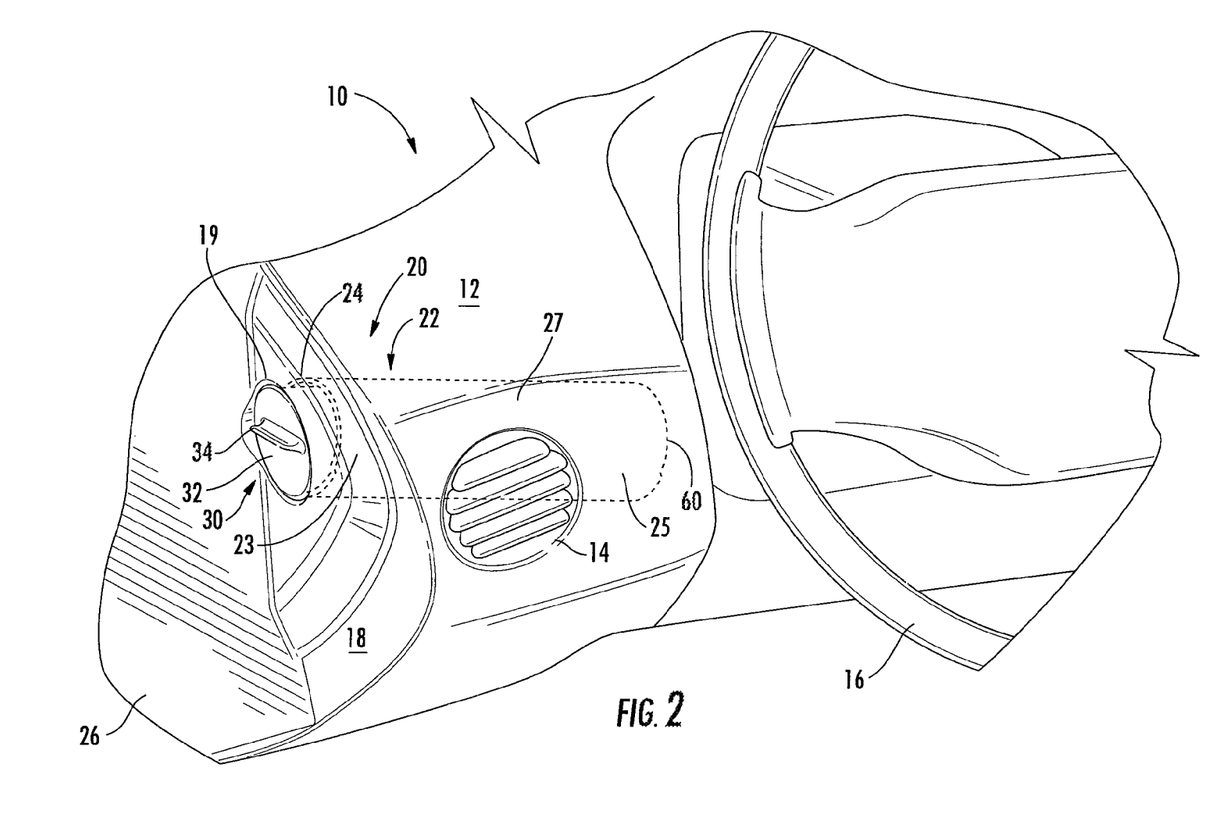
FIG. 2 is a perspective view of the panel end cap storage unit in the closed position.

Referring to FIG. 2, the panel end cap storage unit 20 is shown in the stowed position, wherein the tray insert 30 is fully recessed into the cavity portion 27 of the storage housing 22 within the instrument panel 12. When in the stowed position, the front wall 32 of the insert tray 30 closes and fully covers aperture 19 in the instrument panel end cap 18.

Figure 3:
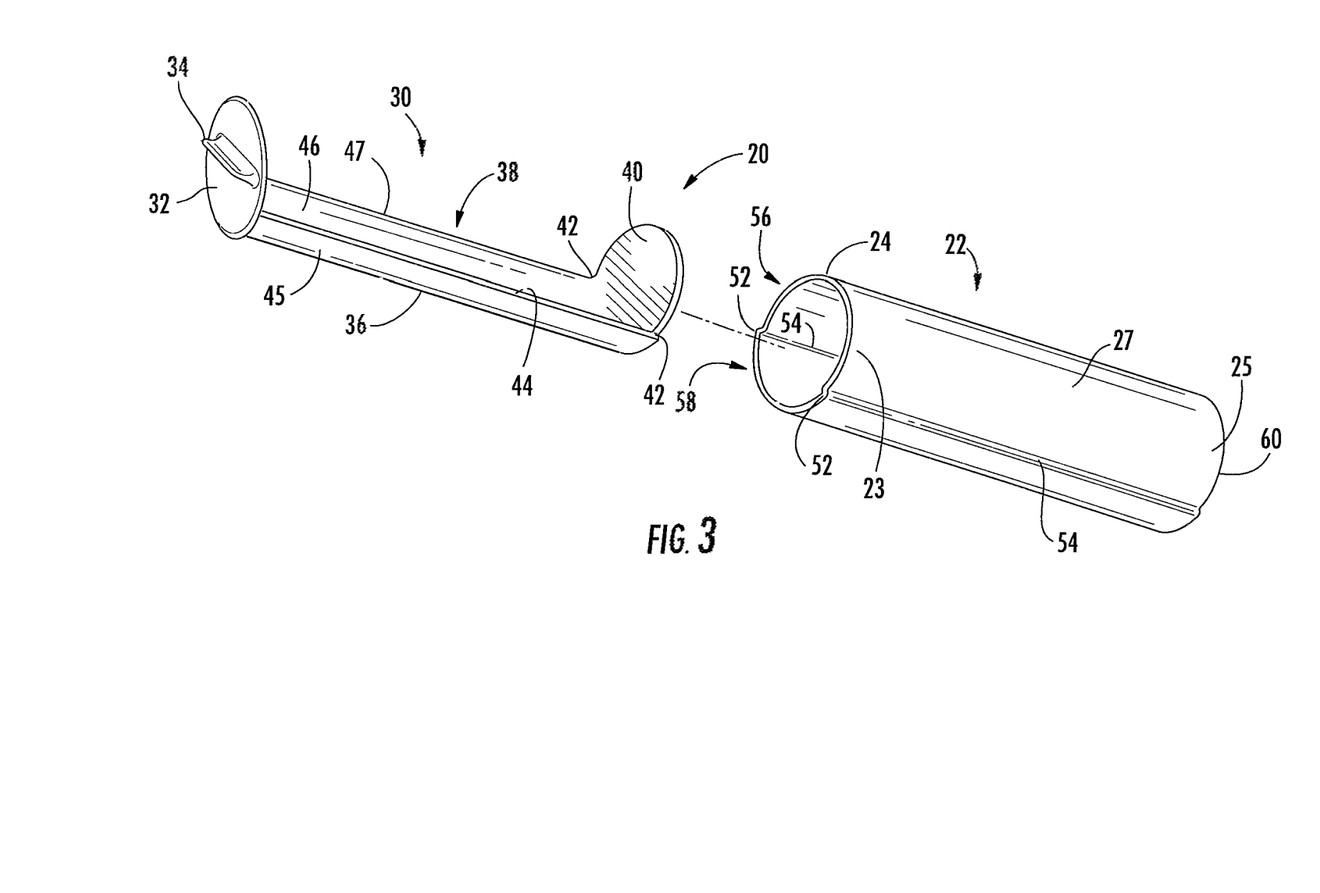
FIG. 3 is a perspective view of a storage housing and tray insert.

Referring now to FIG. 3, the tray insert 30 is shown in a removed position relative to the storage housing 22. As shown in FIGS. 1-3, the storage unit 20 is generally defined by a cylindrical vessel or housing 22 with an insert tray 30 that has a corresponding shape for being slideably received into the storage housing 22. However, it is contemplated that various shapes for the storage unit 20 can be used in different embodiments of the present invention. As shown in FIG. 3, the tray insert 30 includes a storage compartment 38 for storing the vehicle user's items. In the embodiment shown in FIG. 3, the storage compartment 38 is defined by the front wall 32, side walls 45, 46, bottom wall 36, and rear wall 40. In this embodiment, the storage compartment 38 has a semicircle cradle-like configuration for storing the vehicle user's items. As shown in FIG. 3, the storage compartment 38 of the tray insert 30 comprises a semicircle configuration of a larger dimension than that of the rear wall 40, which also has a semicircle configuration. The side walls 46 and 45 of storage compartment 38 have top portions 44 and 47, respectively, which form contours 42 at the intersection of the rear wall 40 and the storage compartment 38 of the tray insert 30.

As further shown in FIG. 3, the storage housing 22 has an upper portion 56 and a lower portion 58, wherein the lower portion 58 is configured to engage the storage compartment 38 of the tray insert 30. The lower portion 58 of the storage housing 22 comprises a semicircle of a larger dimension than that of the upper portion 56 of the storage housing 22, such that, at the junction of the upper portion 56 and lower portion 58 of the storage housing 22, guides 54 are formed which run the length of the housing 22 and thereby define a tray insert channel. The guides 54 are disposed at the opening 24 of the storage housing 22 and thereby create contours 52 at the opening 24, which correlate to the contours 42 of the tray insert 30. Thus, the housing 22 has a cross-sectional configuration that correlates to the configuration of the rear wall 40 and the side walls 44, 45 of the tray insert 30, such that the tray insert 30 correlates in configuration to the housing 22 to provide a close slideable and telescoping engagement between the tray insert 30 and the housing 22 in assembly. In this way, the tray insert 30 is insertable into the storage housing 22 in an upright configuration only, such that the tray insert channel acts as an anti-rotational device in assembly.

Figure 3A:
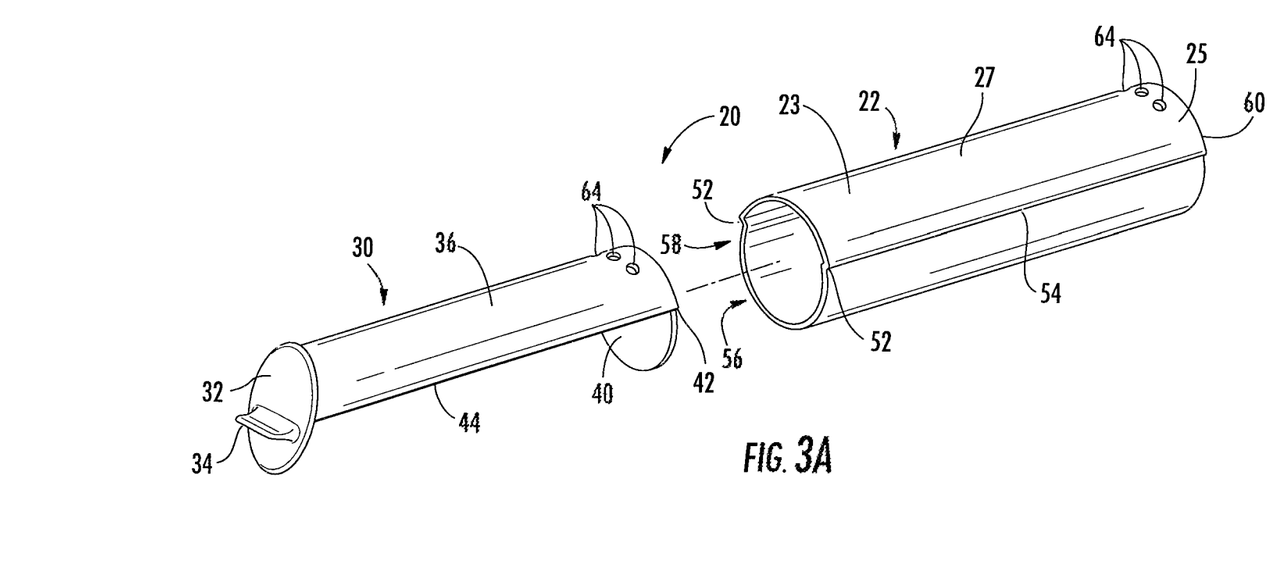
FIG. 3A is a perspective view of a storage housing and tray insert.

As shown in FIGS. 1 and 2, the housing 22 of the panel end cap storage unit 20 is angled downward relative to the instrument panel end cap 18. In this way, if the user of the panel end cap storage unit 20 places a wet umbrella in the tray insert 30, such as the umbrella 50 shown in FIG. 1, the downward angle of the panel end cap storage unit 20 will allow for the water from the umbrella to flow downwardly to drainage apertures 64 located in the bottom wall 36 of the tray insert 30, as shown in FIG. 3A. Drainage apertures 64 are also located in the lower portion 58 of the housing 22 near the lower second end 25 of the housing 22. As the panel and end cap storage unit 20 is angled downwardly, items, such as keys, a cell phone, coins, or a wallet, may be irretrievable by the vehicle user if placed directly into the storage housing 22 as these items would likely slide along the downward angle of the housing 22 and eventually abut the end wall 60, making these items difficult to retrieve. Where elongate items, such as the umbrella shown in FIG. 1, may be directly insertable into the storage housing 22 and then be retrieved by the vehicle user due to its overall length, small items, such as keys, wallets, cell phones, etc. will need the tray insert 30 to cradle and store those items in the storage compartment 38 of the tray 30, such that the tray 30 can then be removed from the storage housing 22 to retrieve those stored items. In this way, the present invention allows for smaller items to be stored in the panel end cap storage unit 20 while also making these items easily retrievable using the removable tray insert 30.

Figure 4:
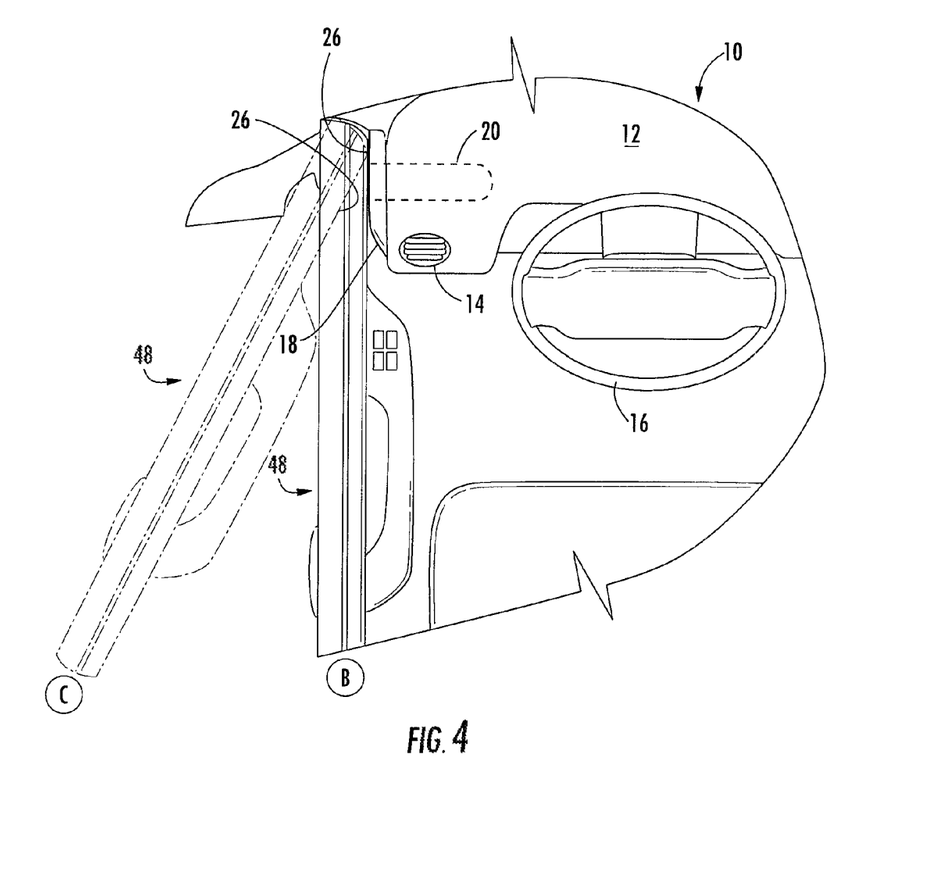
FIG. 4 is a top plan view of a vehicle interior having a panel end cap storage unit, illustrating relative movement of a vehicle door in reaction to the unit.

Referring now to FIG. 4, the reference numeral 10 generally designates a vehicle interior and specifically designates the vehicle interior on the driver's side. Vehicle interior 10 includes instrument panel 12 upon which a vent 14 and a steering wheel 16 are generally disposed. The instrument panel 12 further comprises an instrument panel end cap 18 disposed at the end of the instrument panel 12 having an aperture, not shown, which opens into the vehicle instrument panel 12, wherein a panel end cap storage unit 20 is disposed. As shown in FIG. 4, the instrument panel end cap 18 is situated adjacent a vehicle door 48 having an interior trim door panel 26. As also shown in FIG. 4, the vehicle door 48 is in the closed position B, such that the vehicle door interior trim panel 26 abuts the panel end cap 18, making the panel end cap storage unit 20 inaccessible. Thus, in this way, the panel end cap storage unit 20 is only accessible when the vehicle door 48 is in an open position (position C), as shown in phantom in FIG. 4. Having accessibility conditioned on the vehicle door's position, the panel end cap storage unit 20 provides for a hidden and lockable storage unit which cannot be accessed by others when the vehicle door 48 is closed (in position B) and locked. Thus, the panel end cap storage unit 20 provides a secure and nonvisible storage solution inside a vehicle interior 10. It is contemplated that the present invention is particularly well suited for convertible vehicles when the top is down and no lockable storage is available.

Figure 5:
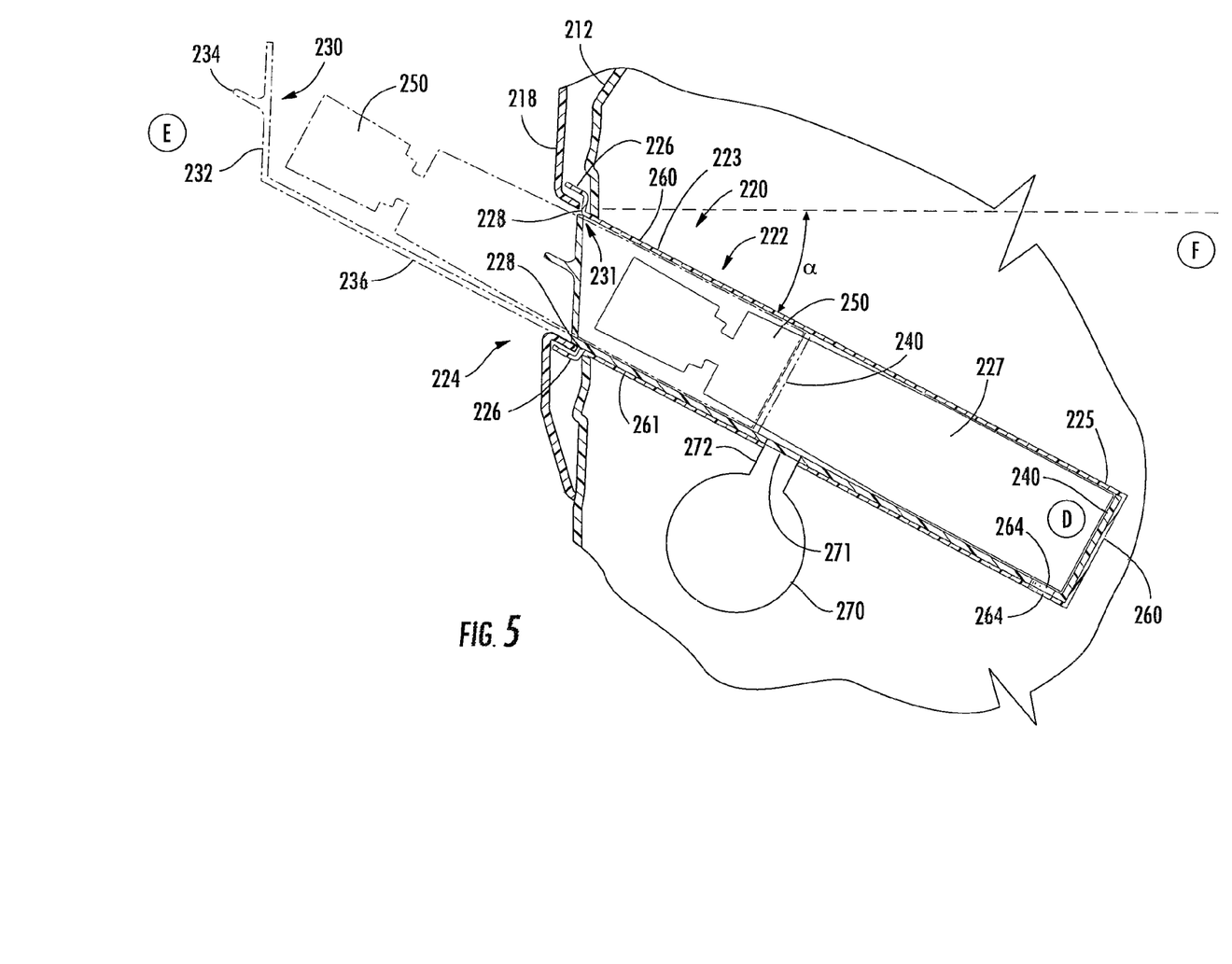
FIG. 5 is a cross-sectional view of a vehicle instrument panel end and a vehicle panel end cap storage unit according to another embodiment of the present invention.

Referring now to FIG. 5, the reference numeral 220 generally designates a panel end cap storage unit of another embodiment of the present invention. The panel end cap storage unit 220 comprises a housing 222 having an upper first end 223 and a lower first end 225 and a body portion 227, which is in the configuration of a tube-like cavity. Disposed on the upper first end 223 of the housing 222 is an opening 231 which corresponds to an opening 224 in a vehicle instrument panel 212 as well as in a vehicle instrument panel end cap 218. In this way, the housing 222 is accessible for slideable engagement with a tray insert 230. As shown in FIG. 5, the tray insert 230 has a front wall 232 having a pull or handle 234, a bottom wall 236, and a rear wall 240. The tray insert 230 is shown in FIG. 5 with an umbrella 250 stored therein. As shown in FIG. 5, the tray insert 230 is slideably engaged with the housing 222 between a stowed position D, wherein the tray insert 230 abuts a rear wall 260 of the housing 222 disposed on the lower end 225 of the housing 222, and a deployed position E, which is shown in FIG. 5 in phantom. Thus, the embodiment shown in FIG. 5 depicts a panel end cap storage unit 220 having an insertable tray 230 for storing items of the vehicle user in a similar manner as described in the embodiments discussed above. The housing 222 further comprises flanged portions 226 disposed on the top wall 260 and bottom wall 261 of the housing 222 near the upper first end 223. The flanged portions 226 operably couple the housing 222 to apertures 228 disposed between the vehicle end cap 218 and the vehicle instrument panel 212 to retain the housing 222 in place.

As shown in FIG. 5, the panel end cap storage unit 220 is angled downward relative to a longitudinal access of the vehicle panel as indicated by line F. The downward angle of housing 222 is shown by the symbol a (theta) and is preferably within a range of 5° to 45°. The downward angle of the panel end cap storage unit 220 allows for water, possibly from a wet umbrella being stored in the tray insert 230, to flow downwardly to drainage apertures 264 disposed in the bottom wall 236 of the tray insert 230 near the rear wall 240 of the tray insert 230 and drainage apertures 264 disposed in the bottom wall 261 of the housing 222 near the second lower end 225 of the housing 222. As shown in FIG. 5, the housing 222 further comprises an aperture 271 disposed on the bottom wall 261 which connects to a ventilation duct 270 via a connection tube 272. In this way, the storage unit 220 can receive ventilation from the air flow within the air duct or vent 270 when the vehicle HVAC system is in use. Such ventilation will help the storage unit 220 to remain odor free, especially when a potentially wet umbrella is stored therein.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A storage unit disposed on a panel end cap adjacent a vehicle door, the storage unit comprising:
   a housing having an open upper first end defining a housing entrance and a closed horizontally lower second end having at least one drainage aperture, wherein the entrance is not accessible when the adjacent vehicle door is in a closed position, and further wherein the housing defines a cylindrical cavity having an upper portion with a first diameter and a lower portion with a second diameter, the second diameter being greater than the first diameter; and
   a tray insert slideably received within the housing and having a storage compartment.

2. A storage unit as set forth in claim 1, wherein:
   the housing is operably coupled to a ventilation duct at an aperture disposed on the housing.

3. A storage unit as set forth in claim 1, wherein:
   the housing is disposed within a vehicle panel and has a downward angle in a range of approximately 5° to 45° with respect to a longitudinal axis of the vehicle panel, such that first open end of the housing is higher in level than the second end.

4. A storage unit as set forth in claim 3, wherein:
   the tray insert is slideable between a stowed position and a removed position relative to the housing, and further wherein the storage compartment of the tray insert is defined by a front wall, bottom wall, side walls and a rear wall.

5. A storage unit as set forth in claim 4, wherein:
   the bottom wall of the storage compartment comprises at least one drainage aperture.

6. A storage unit disposed on a panel end cap adjacent a vehicle door, the storage unit comprising:
   an elongate cylindrical housing having a first end with an opening and a closed second end, wherein the opening is not accessible when the adjacent vehicle door is in a closed position;
   wherein the housing includes upper and lower portions, the lower portion having a larger dimension relative to the upper portion, such that guides are defined at an intersection of the upper and lower portions; and
   a cylindrical tray insert having a storage compartment slideably supported on the guides.

7. A storage unit as set forth in claim 6, wherein:
   the housing is operably coupled to a ventilation duct at an aperture disposed on the housing.

8. A storage unit as set forth in claim 6, wherein:
   the tray insert is slideable between a stowed position and a removed position relative to the housing, and further wherein the storage compartment of the tray insert is defined by a front wall, bottom wall, side walls and a rear wall.

9. A storage unit as set forth in claim 8, wherein:
   the front wall of the storage compartment covers the opening when the tray insert is in the stowed position, and further wherein the front wall includes a pull.

10. A storage unit as set forth in claim 8, wherein:
    the housing includes a downward cant from the first end to the second end.

11. A storage unit as set forth in claim 10, wherein:
    the bottom wall of the storage compartment comprises at least one drainage aperture; and
    the second end of the housing comprises at least one drainage aperture.

12. A storage unit disposed on a panel end cap adjacent a vehicle door, the storage unit comprising:
    a housing having a cavity portion defined by an open upper first end and a closed lower second end, wherein the first end is not accessible when the adjacent vehicle door is in a closed position, and further wherein the housing defines a cylindrical cavity having an upper portion with a first diameter and a lower portion with a second diameter, the second diameter being greater than the first diameter;
    guides integrally formed along the housing between the first and second ends at an intersection of the upper portion and the lower portion of the housing; and
    a cylindrical tray insert removably supported on the guides of the housing, the tray insert having a storage compartment.

13. A storage unit as set forth in claim 12, wherein:
    the housing includes a downward cant from the upper first end to the lower second end.

14. A storage unit as set forth in claim 12, wherein:
    the tray insert is slideable between a stowed position and a removed position relative to the housing, and further wherein the storage compartment of the tray insert is defined by a front wall, bottom wall, side walls and a rear wall.

15. A storage unit as set forth in claim 4, wherein:
    a cross section of the housing defines a tray insert channel, and the rear wall of the tray insert has a correlating configuration to the cross section of the housing.

16. A storage unit as set forth in claim 14, wherein:
    the front wall of the storage compartment covers the open upper first end when the tray insert is in the stowed position, and further wherein the front wall includes a pull.

17. A storage unit as set forth in claim 6, wherein:
    the bottom wall of the storage compartment comprises at least one drainage aperture; and
    the lower second end of the housing comprises at least one drainage aperture.

* * * * *